US008843126B1

(12) United States Patent
Richard

(10) Patent No.: US 8,843,126 B1
(45) Date of Patent: Sep. 23, 2014

(54) SYSTEM FOR ISOLATION TESTING OF RF TRANSMITTERS AND RECEIVERS

(75) Inventor: Curtis Z. Richard, Middletown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 277 days.

(21) Appl. No.: 13/566,418

(22) Filed: Aug. 3, 2012

(51) Int. Cl.
H04W 24/00 (2009.01)
(52) U.S. Cl.
USPC ........... 455/423; 505/126; 505/779; 540/108; 370/249; 370/252; 370/503
(58) Field of Classification Search
CPC ..... H04W 24/00; H04W 24/08; H04W 56/00; H04W 24/10; H04W 72/085; H04W 16/22
USPC ............... 455/423, 67.11, 41.1, 67.12, 67.14, 455/115.1, 115.2, 226.1
See application file for complete search history.

(56) References Cited

U.S. PATENT DOCUMENTS

| | | | | | |
|---|---|---|---|---|---|
| 6,002,869 | A | * | 12/1999 | Hinckley | 717/124 |
| 6,654,914 | B1 | * | 11/2003 | Kaffine et al. | 714/43 |
| 6,904,544 | B2 | * | 6/2005 | DeRolf et al. | 714/43 |
| 7,370,238 | B2 | * | 5/2008 | Billick et al. | 714/36 |
| 7,509,533 | B1 | * | 3/2009 | Govindarajalu | 714/30 |
| 7,580,684 | B2 | * | 8/2009 | Cyr et al. | 455/75 |
| 7,907,580 | B2 | * | 3/2011 | Ametsitsi | 370/338 |
| 8,472,327 | B2 | * | 6/2013 | DelRegno et al. | 370/249 |

* cited by examiner

Primary Examiner — Marceau Milord
(74) Attorney, Agent, or Firm — James M. Kasischke; Jean-Paul A. Nasser; Michael P. Stanley

(57) ABSTRACT

A programmable device generates a test signal indicative of a RF signal and receives a processed test signal indicative of the test signal after processing thereof by one of a RF transmission system and a RF receiving system. The programmable device performs a comparison between the processed test signal and calibration data, and generates a report based on the comparison. A hardwire signal router provides the test signal to one of the RF transmission system and the RF receiving system, and provides the processed test signal to the programmable device. The router includes a first switching mechanism and a second switching mechanism operating in a coordinated fashion to define one of a first state for testing the RF transmission system and a second state for testing the RF receiving system.

8 Claims, 2 Drawing Sheets

SYSTEM FOR ISOLATION TESTING OF RF TRANSMITTERS AND RECEIVERS

STATEMENT OF GOVERNMENT INTEREST

The invention described herein may be manufactured and used by or for the Government of the United States of America for governmental purposes without the payment of any royalties thereon or therefore.

CROSS-REFERENCE TO RELATED PATENT APPLICATIONS

None.

BACKGROUND OF THE INVENTION (1) Field of the Invention

The present invention relates generally to the testing of transmitters and receivers, and more particularly to a system that can perform isolation testing of a radio frequency (RF) transmitter or an RF receiver.

(2) Description of the Prior Art

Currently, the testing and diagnosing of a faulty radio frequency (RF) transmission and receiving systems requires that the system be taken out of the field to a lab/testing location. This is a time-consuming process. Further, if a problem exists in a network of RF transmission/receiving systems, repair technicians are forced to guess at which system should be pulled out of the network for testing.

SUMMARY OF THE INVENTION

Accordingly, it is an object of the present invention to provide a system for testing an RF transmission and receiving system.

Another object of the present invention is to provide a system that can be used for field testing of an RF transmission and receiving system.

Still another embodiment of the present invention is to provide a system that can be used to field test the transmission portion or receiving portion of an RF transmission and receiving system.

Other objects and advantages of the present invention will become more obvious hereinafter in the specification and drawings.

In accordance with the present invention, a system for performing isolation testing of radio frequency (RF) transmission and receiving systems includes a programmable device that generates a test signal indicative of a RF signal and receives a processed test signal indicative of the test signal after processing thereof by one of a RF transmission system and a RF receiving system. The programmable device performs a comparison between the processed test signal and calibration data, and generates a report based on the comparison. A hardwire signal router provides the test signal to one of the RF transmission system and the RF receiving system, and provides the processed test signal to the programmable device. The router includes a first switching mechanism and a second switching mechanism operating in a coordinated fashion to define one of a first state and a second state. The first state is defined when (i) the first switching mechanism directs the test signal to an input of the RF transmission system wherein the RF transmission system generates the processed test signal, and (ii) the second switching mechanism directs the processed test signal so-generated by the RF transmission system to the programmable device. The second state is defined when (i) the second switching mechanism directs the test signal to an input of the RF receiving system wherein the RF receiving system generates the processed test signal, and (ii) the first switching mechanism directs the processed test signal so-generated by the RF receiving system to the programmable device.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
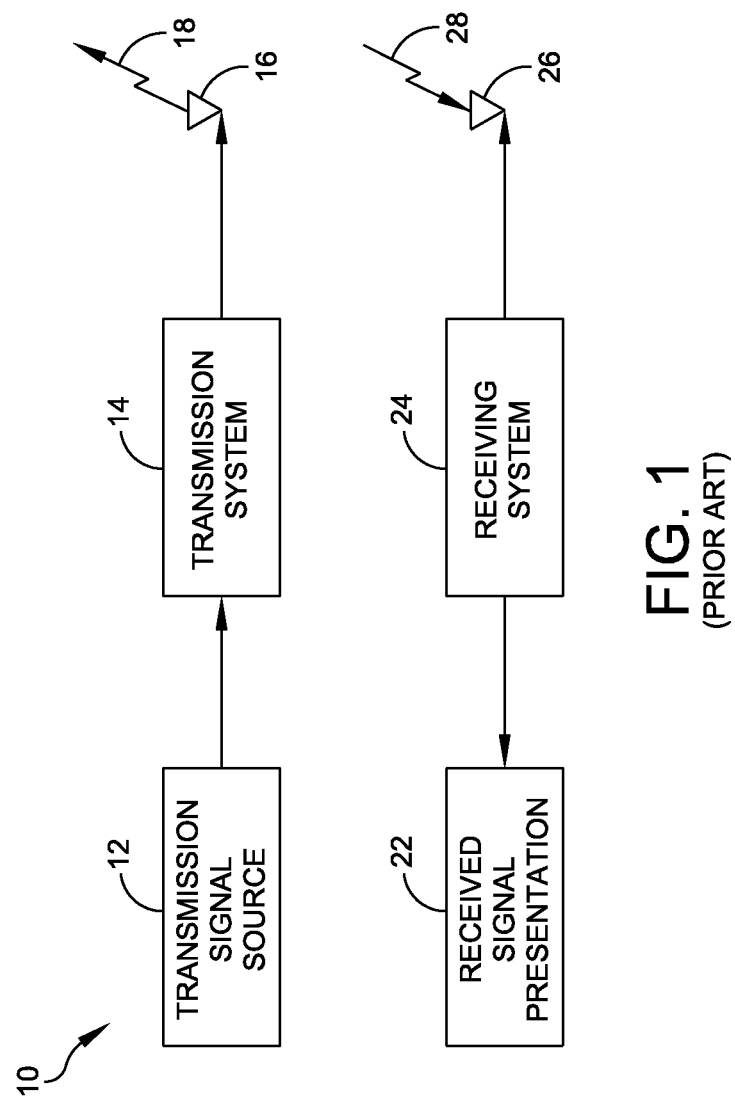
FIG. 1 is a top-level block diagram of an RF transmission and receiving system in accordance with the prior art.

Referring now to the drawings and more particularly to FIG. 1, a block diagram of a prior art RF transmission and receiving system is shown and is referenced generally by numeral 10. A transmission signal source 12 provides transmission data to a transmission system 14 that formats the transmission data for transmission as an RF signal 18 by an antenna 16. On the receiving side of system 10, an antenna 26 receives an RF signal 28 and couples same to a receiving system 24 that formats RF signal 28 for presentation to a user by a received signal presentation module 22 (e.g., display, audio reproduction and/or hard copy presentation, etc.).

Figure 2:
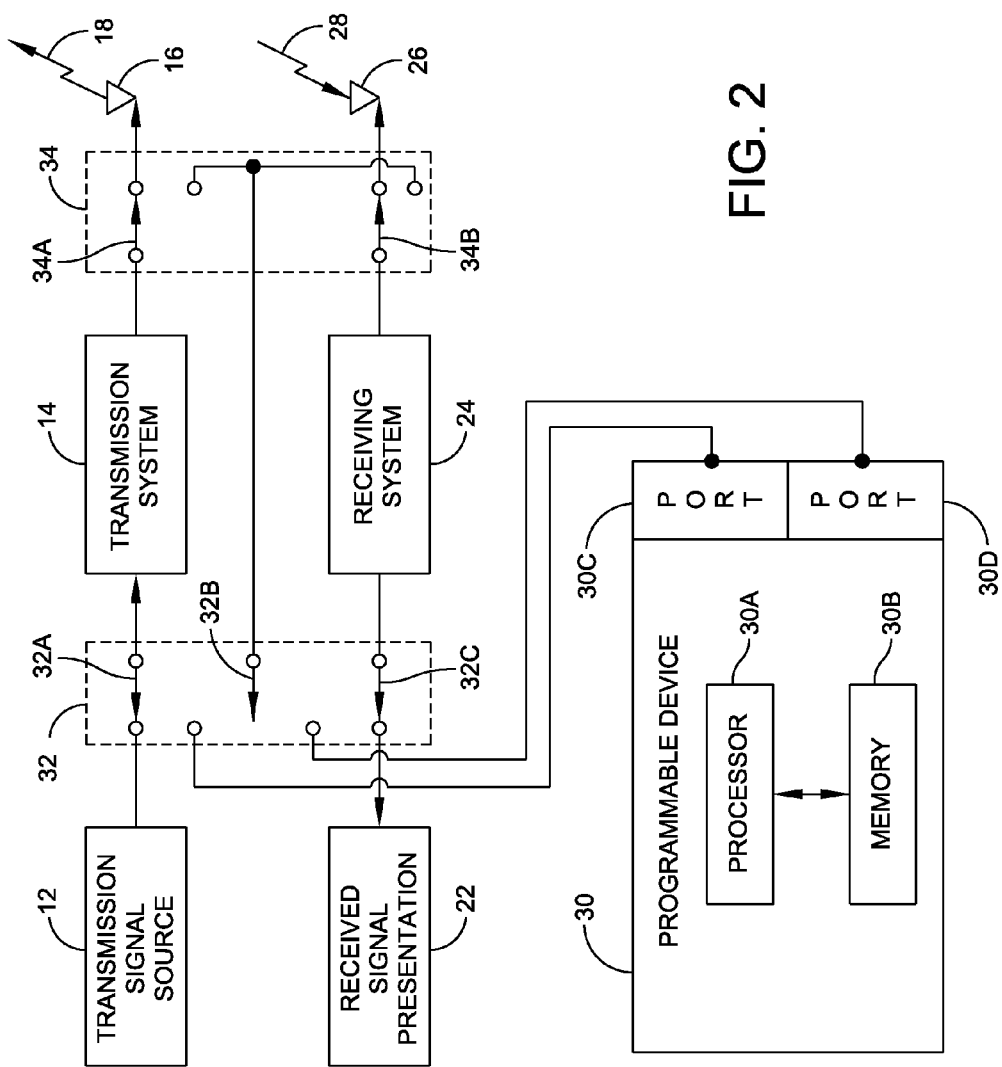
FIG. 2 is a schematic diagram of a system for performing isolation testing of the transmission portion or receiving portion of an RF transmission and receiving system in accordance with the present invention.

Referring now to FIG. 2, the above-described RF transmission and receiving system 10 is illustrated with the present invention's system for performing isolation testing of either transmission system 14 or receiving system 24. Briefly, the present invention includes a programmable device 30 hard wired to system 10 where such hardwiring includes switching mechanisms 32 and 34 operable to issue test signals to (and received processed test signals from) one of transmission 14 and receiving system 24.

Programmable device 30 includes a processor 30A, memory 30B, a port 30C for injecting signals indicative of either RF transmission data (for transmission system 14) or an RF signal (for receiving system 24), and a port 30D for receiving signals indicative of either formatted transmission data (from transmission system 14) or presentation of formatted received data (from receiving system 24). In general, processor 30A sweeps one or more user selected waveforms through a selected frequency range based on application requirements. The testing sequence can be pre-programmed into memory 30B.

Switching mechanisms 32 and 34 are set to isolate signal routing through either transmission system 14 or receiving system 25. More specifically, switches 32A, 32B and 34A are operated to couple transmission system 14 to ports 30C and 30D when performing isolated testing of transmission system 14. In a similar fashion, switches 32B, 34B and 32C are operated to couple receiving system 24 to ports 30C and 30D when performing isolated testing of receiving system 24.

In either of the above-described testing scenarios/states, the signals/data received at port 30D can be compared (by processor 30A) to calibration data stored in memory 30B. The results of the comparisons can be in the form of a report (e.g., simple "pass-fail" report, graphical data reports, etc.) that can be displayed in real-time via a display 36 and/or stored in memory 30B.

Programmable device 30 can be based on a software defined radio (SDR) configured to operate as described herein. By way of example, one such software defined radio is the open source GNU radio platform utilizing the Universal Software Radio Peripheral.

The advantages of the present invention are numerous. Isolation testing of RF transmission and receiving systems can be performed in the field with a low-cost device. Tests can be pre-programmed such that a technician can readily determine if a transmission or receiving system is faulty. The invention will be particularly useful when trouble shooting RF transmission and receiving systems in the field.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A system for performing isolation testing of radio frequency (RF) transmission and receiving systems, comprising:
    a programmable device for generating a test signal indicative of a RF signal and for receiving a processed test signal indicative of said test signal after processing thereof by one of a RF transmission system and a RF receiving system adapted to be coupled to said programmable device, said programmable device performing a comparison between said processed test signal and calibration data, and said programmable device generating a report based on said comparison; and
    a hardwire signal router adapted to provide said test signal to one of the RF transmission system and the RF receiving system, said router further adapted to provide said processed test signal to said programmable device, said router including a first switching mechanism and a second switching mechanism operating in a coordinated fashion to define one of a first state and a second state,
    said first state defined when (i) said first switching mechanism is adapted to direct said test signal to an input of the RF transmission system wherein the RF transmission system generates said processed test signal, and (ii) said second switching mechanism is adapted to direct said processed test signal so-generated by the RF transmission system to said programmable device, and
    said second state defined when (i) said second switching mechanism is adapted to direct said test signal to an input of the RF receiving system wherein the RF receiving system generates said processed test signal, and (ii) said first switching mechanism is adapted to direct said processed test signal so-generated by the RF receiving system to said programmable device.

2. A system as in claim 1, wherein said programmable device includes memory for storing said calibration data.

3. A system as in claim 1, wherein said programmable device includes memory for storing said report.

4. A system as in claim 1, wherein said programmable device includes memory for storing said calibration data and said report.

5. A system as in claim 1, wherein said programmable device comprises a software defined radio.

6. A system as in claim 1, wherein said test signal comprises a frequency swept signal.

7. A system for performing isolation testing of radio frequency (RF) transmission and receiving systems, comprising:
    a software defined radio (SDR) for generating a test signal indicative of a RF signal and for receiving a processed test signal indicative of said test signal after processing thereof by one of a RF transmission system and a RF receiving system adapted to be coupled to said SDR, said SDR performing a comparison between said processed test signal and calibration data stored by said SDR, and said SDR generating and storing a report based on said comparison; and
    a hardwire signal router adapted to provide said test signal to one of the RF transmission system and the RF receiving system, said router further adapted to provide said processed test signal to said SDR, said router including a first switching mechanism and a second switching mechanism operating in a coordinated fashion to define one of a first state and a second state,
    said first state defined when (i) said first switching mechanism is adapted to direct said test signal to an input of the RF transmission system wherein the RF transmission system generates said processed test signal, and (ii) said second switching mechanism is adapted to direct said processed test signal so-generated by the RF transmission system to said SDR, and
    said second state defined when (i) said second switching mechanism is adapted to direct said test signal to an input of the RF receiving system wherein the RF receiving system generates said processed test signal, and (ii) said first switching mechanism is adapted to direct said processed test signal so-generated by the RF receiving system to said SDR.

8. A system as in claim 7, wherein said test signal comprises a frequency swept signal.

* * * * *